July 6, 1965  C. E. BENNER  3,192,536
HEADGEAR AND HAMMOCK ASSEMBLY CONNECTING MEANS THEREFOR
Filed Oct. 28, 1963  4 Sheets-Sheet 1
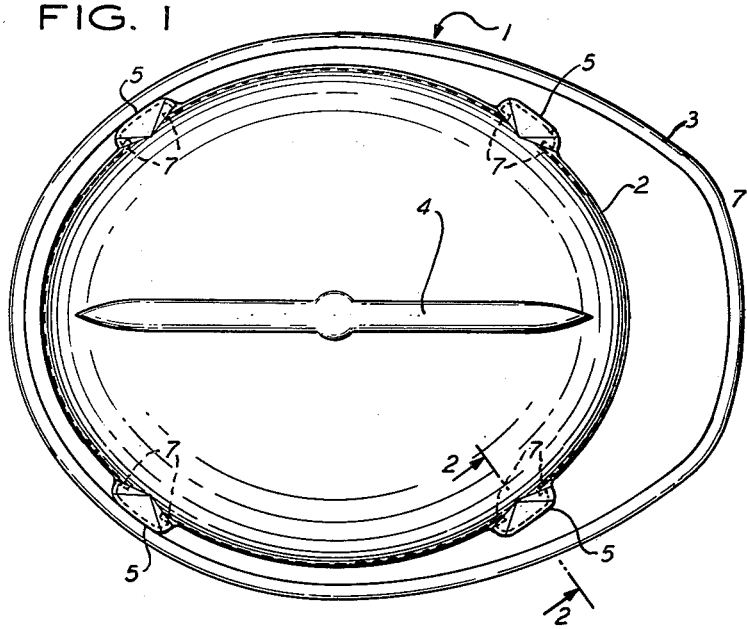
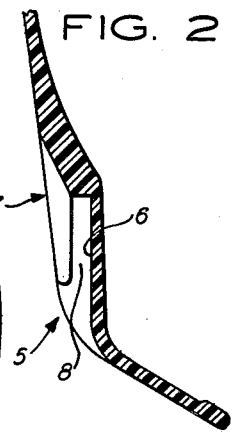
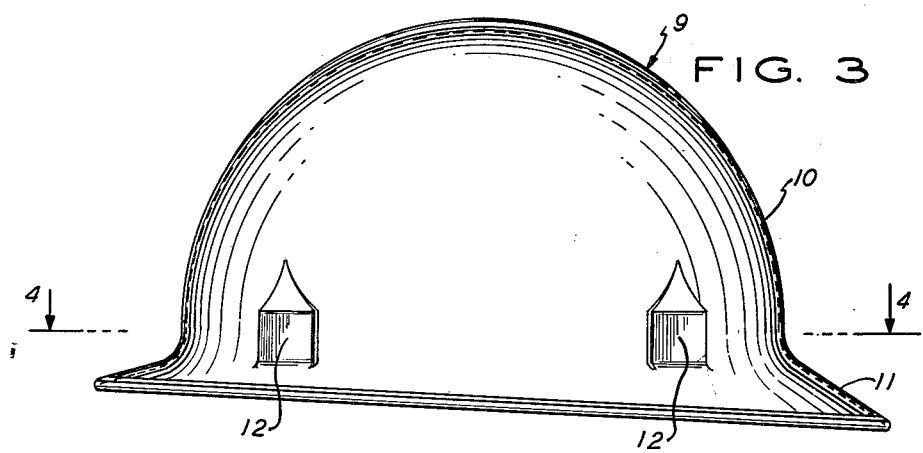
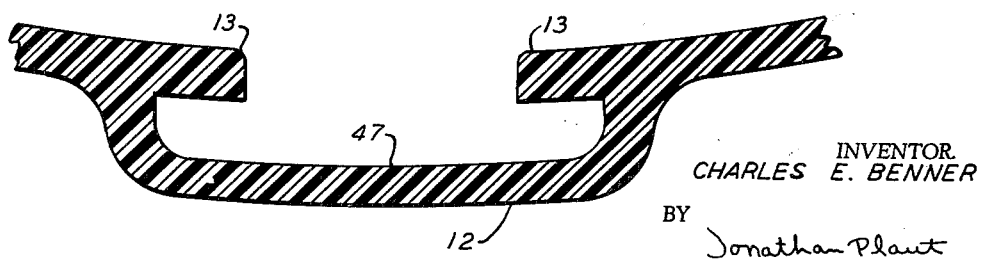
INVENTOR.
CHARLES E. BENNER
BY Jonathan Plaut
ATTORNEY July 6, 1965 C. E. BENNER 3,192,536
HEADGEAR AND HAMMOCK ASSEMBLY CONNECTING MEANS THEREFOR
Filed Oct. 28, 1963 4 Sheets-Sheet 2

INVENTOR
CHARLES E. BENNER
BY Jonathan Plaut
ATTORNEY

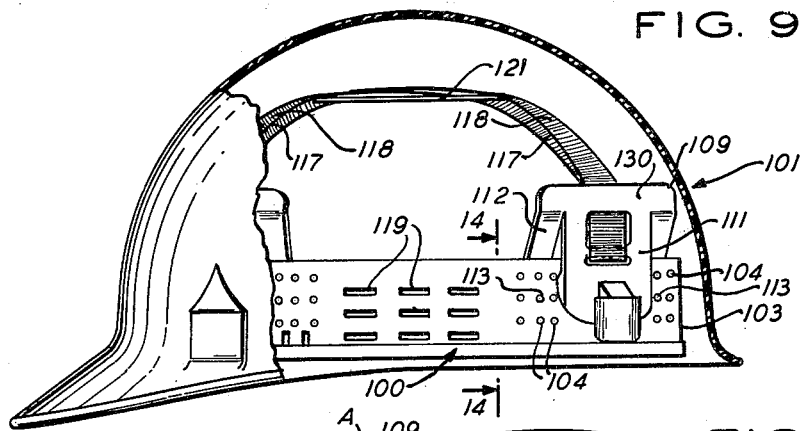
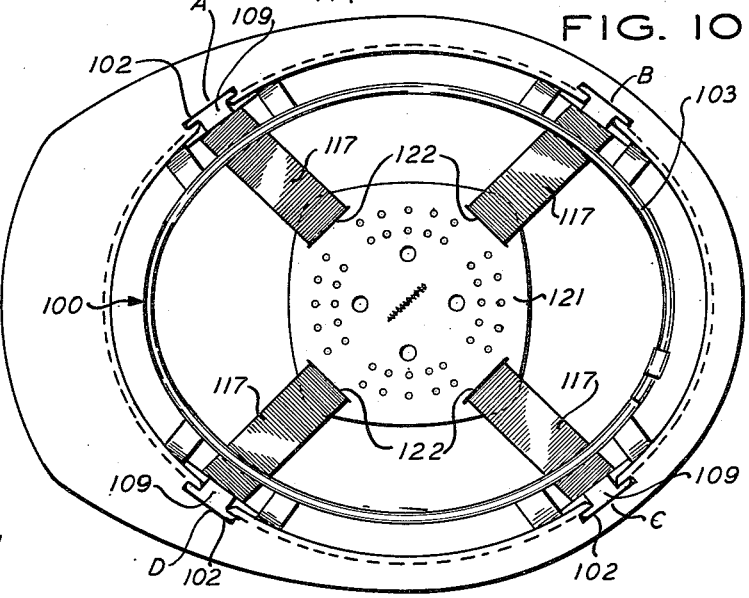
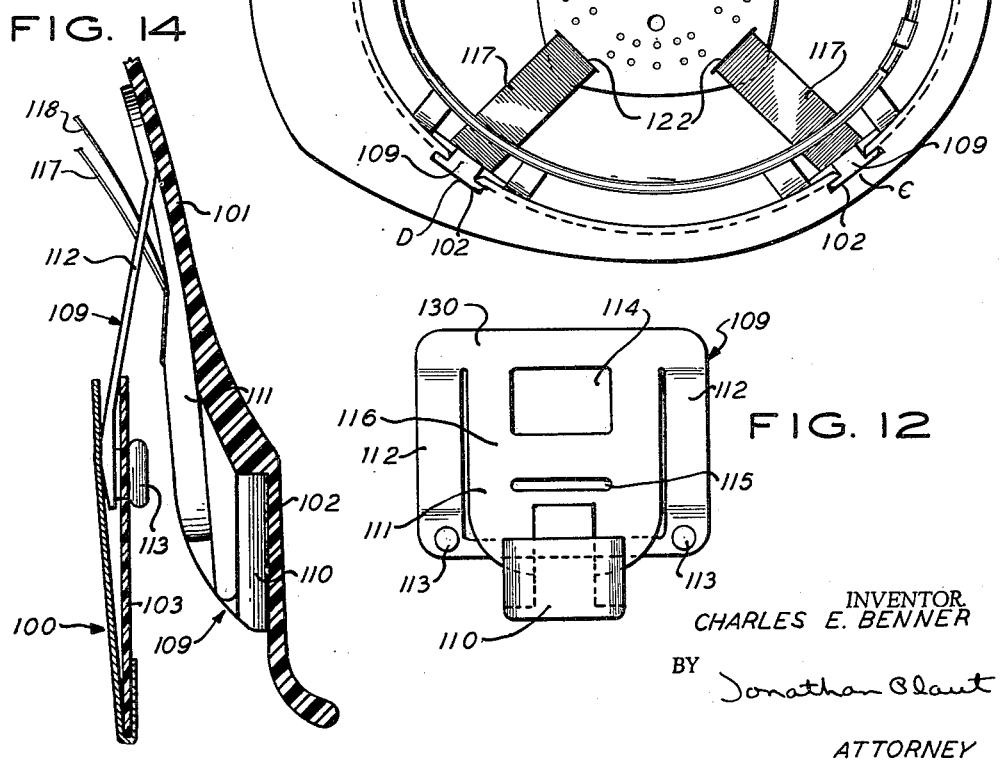

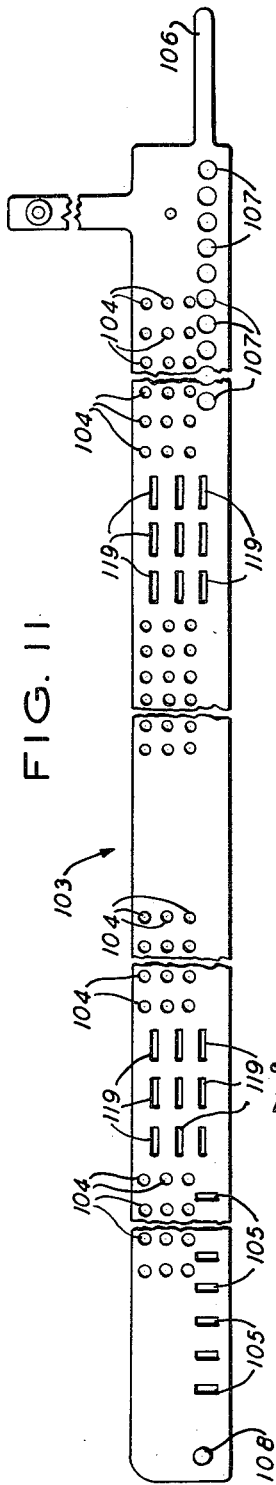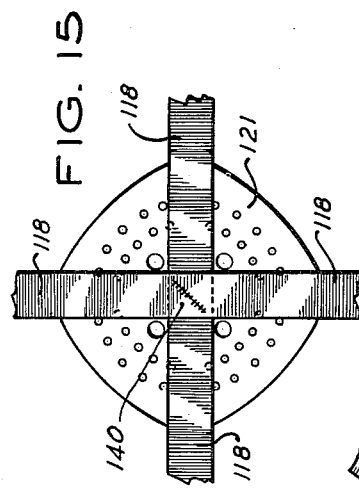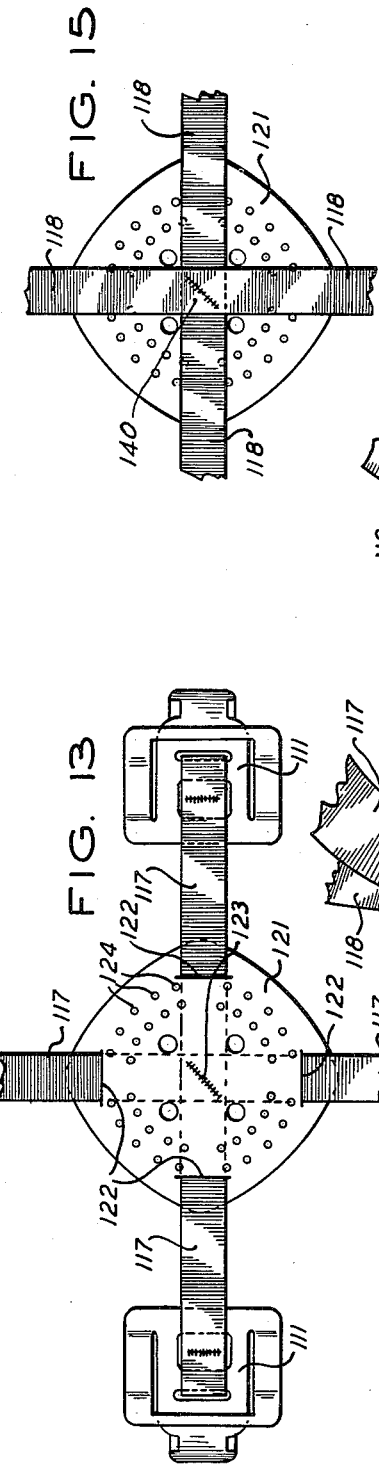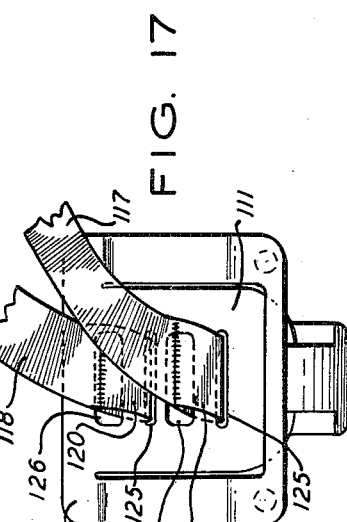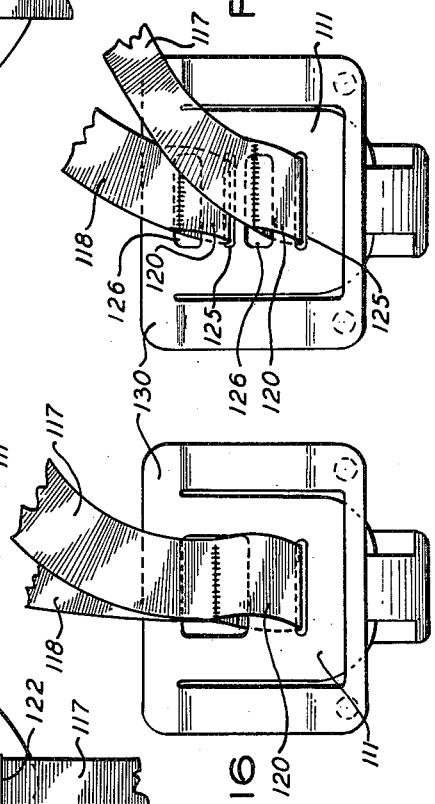

United States Patent Office 3,192,536
Patented July 6, 1965

3,192,536
HEADGEAR AND HAMMOCK ASSEMBLY
CONNECTING MEANS THEREFOR
Charles E. Benner, Grosse Pointe Woods, Mich., assignor to Air Reduction Company, Incorporated, New York, N.Y., a corporation of New York
Filed Oct. 28, 1963, Ser. No. 319,170
8 Claims. (Cl. 2—3)

This invention relates to head protecting apparatus and is more particularly related to safety shell structure and to hammock apparatus supporting said shell structure upon a wearer's head.

More particularly, this invention relates to the creation of a standard design for a head covering safety shell, which design can be incorporated in various shell structure shapes, such as hats, caps, welders helmet equipment, etc., of various materials. This invention further relates to a novel hammock assembly, said hammock assembly attachable to shells of the standard design referred to in the preceding sentence and comfortably and stably mounting said shells upon a wearer's head for maximum protection.

More particularly, this invention relates to a head covering shell, usually in the form of a hat, cap, or helmet, of any one of a number of materials, with recessed structure for receiving simple novel hammock apparatus, which hammock apparatus is so constructed so as to comfortably fit a wearer's head and to provide, in association with the covering shell, maximum safety for a wearer's head.

Safety shells with hammock apparatus therein are worn by construction workers, engineers, laboratory technicians, field specialists, electrical workers (to impart electrical protection, as well as protection to the head from blows), and many other users who are in need of covering to protect the head from blows or other dangers. It has become customary, and is indeed required in many industries, that safety shells be worn. Federal safety specifications require that shells and inside hammock apparatus meet certain standards of safety; for example, the requirement that there be a 1½ inch clearance from the top of a wearer's head to the inside crown surface of the shell which forms the head covering.

There have been many different designs of structures proposed for the protection of the head. These different designs have been incorporated, for example, in hats, caps, masks for the whole head, and even enclosures for workmen to occupy while performing their jobs. These head protecting structures have been made of various materials, including metal, plastic and fiber glass. Although there have been a multitude of proposals as to different types of head protecting structures, none have been completely satisfactory. Shell structures of different materials are often of different designs, requiring modification of a particular shell to receive a particular hammock assembly or requiring differently designed hammock assemblies for support of a number of different shells on a wearer's head. The fact that shells of different materials and/or different shapes require different hammock assemblies, and thus are not interchangeable, results in numerous disadvantages such as higher cost of manufacture, needless duplication of equipment, and problems for the wearer in assembly of the shell to be worn with its particular hammock assembly, which often reduce head protection. Furthermore, the hammock assemblies that make up the prior art usually contain several features which mar their effectiveness. Often, because of the design, the structure of the hammock assemblies of the prior art cannot provide for a stable mount for a shell on the head of a wearer, cannot provide for a comfortable fit, and cannot provide the maximum protection to the head of a wearer.

The inventor has found that not only is it important to construct a particular head protecting shell, such as a cap of particular design, to receive a particular hammock assembly, which in turn receives the head of a user; but it is equally important to create a standard shell design that can be used as the design of various different shell structures, i.e., caps, hats, etc., of various materials, so that one hammock assembly may be received by any one of a number of different shapes of shells, of different materials.

The inventor has further designed a novel hammock assembly for reception on the head of a wearer and support of the standard shell design just referred to, which hammock assembly stably supports the shell on a wearer's head in a comfortable manner for maximum safety. The advantages of this invention over the prior art will become more apparent as a result of the more detailed description which follows.

It is an object of this invention to provide novel head covering shell structure of a single design, whether said shell takes the form of a hat, cap, helmet or other desired head protective structure.

It is further an object of this invention to provide a hammock assembly which may be interchangeably used with a number of different shapes of head protective shells.

It is a further object of this invention to provide a hammock assembly which will stably and comfortably support, in a number of different positions, a shell on a wearer's head.

It is further an object of this invention to provide a novel standard head covering shell structure design which can receive the same novel hammock assembly for support on the head of a wearer, whether the material from which the shell is made is of plastic, metal, fiber glass, or other materials.

It is further an object of this invention to provide shell structure, formed of any one of a number of materials, be it hat, cap, helmet, etc., which avoids applying pressure to the head of the user at only particular points on said shell structure.

It is further an object of this invention to provide a non-metal shell which is not punctured at any point thereover.

It is further an object of this invention to provide standard fiber glass, plastic, or metal shells in the shape of hats, caps, helmets, or whatever, which will each stably and comfortably receive therein the same hammock assembly, which in turn supports the shell on the head of a wearer for maximum protection.

It is further an object of this invention to provide a hammock assembly which allows for an extra safety factor to insure protection of a wearer's head.

It is a further object of this invention to provide a novel and improved hammock construction.

These and other objects and advantages of the invention will be apparent from the following description.

Generally speaking, the shell structure design of this invention is incorporated in a cap, hat, helmet, or other desired shaped shell. The shape of the shell assembly, that is as a cap, hat, etc., is not the subject matter of this invention and should not limit the scope of this invention. It is to be understood that the term "shell" includes caps, hats, helmets, or similar head protecting structures. The shell of this invention, whether it be made of dielectric material (plastic), fiber glass, metal, or whatever, has spaced recessed areas located in the inner surface of the crown portion thereof which are formed for reception of a connecting member of a hammock assembly. A single hammock assembly, which is also the subject matter of this invention, can be received in the recesses of the shell of this invention, regardless of the material from which said shell is made. In the case of fiber glass or plastic shells, slot structure is molded into the recessed areas of the particular shell, with said slot structure receiving a lug integrally molded to said connecting member, which in turn is supported on the headband of the hammock assembly. In the case of a metal shell, the slot structure is attached to the inside of the crown in each of the recessed areas located in said metal shell; the attachment effected, for example, by the use of a small rivet inserted through said metal shell. The recessing of the metal shell insures that the inside of the crown of the metal shell is of smooth uniform shape, so that no pressures are put on the wearer's head as a result of a blow or the head resting against a protuberance.

The hammock assembly, a head receiving cradle, constructed in accordance with the invention generally comprises a headband, strap structure for receiving the top of a wearer's head, and connecting members connected, when in use with a shell, to both the shell and the headband. The headband is adjustable and normally has a sweatband attached thereto. It is located within the helmet in use, in adjustable position, according to the location of its attachment to the connecting member. Each connecting member is integrally molded, with one part thereof receivable in a recessed area of the shell. Because of the integral molding of the connecting member, and the position of said connecting member when supporting the shell on the headband, the connecting member insures a stable seat for the shell on a wearer's head. The strap structure comprises two separate sets of strap elements, one including a crown piece for reception of the top of a wearer's head. The crown piece adds to both the comfort and safety of the hammock and a shell structure. Two separate sets of strap elements provide for greater protection, as will be discussed more fully during the course of the detailed description which follows.

In greater detail, reference is made to the drawings illustrating the invention, in which:

FIGURE 1 shows a top view of a fiber glass shell, in the form of a cap;

FIGURE 2 is a section view along line 2—2 of FIGURE 1 showing in detail a recess in the shelf;

FIGURE 3 shows a side view of a plastic shell, in the form of a hat;

Figure 4:
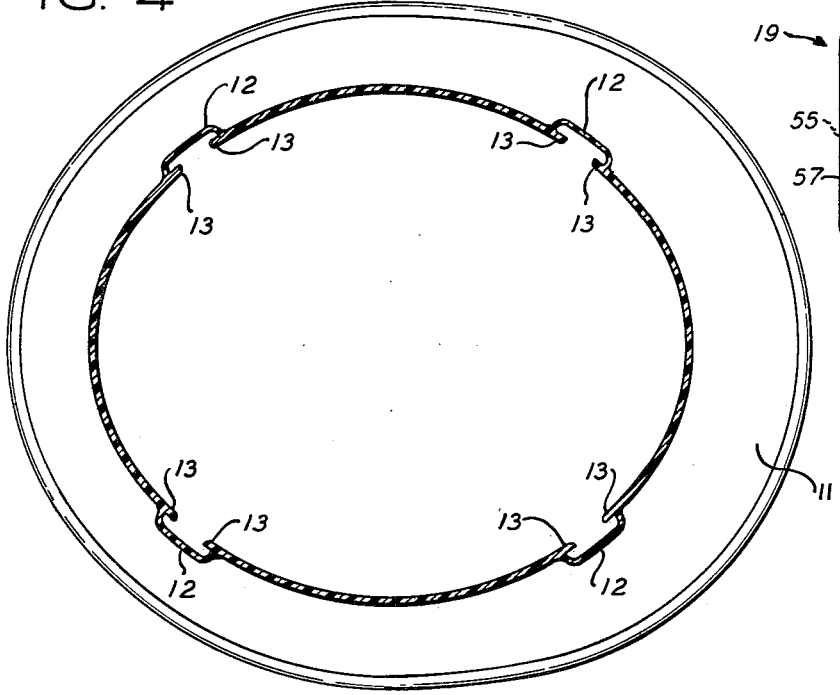
FIGURE 4 is a top view of a part of the shell shown in FIGURE 3, taken along line 4—4.
Figure 8:
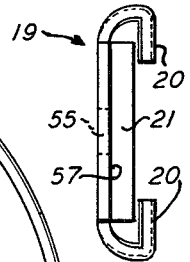
Figure 5:
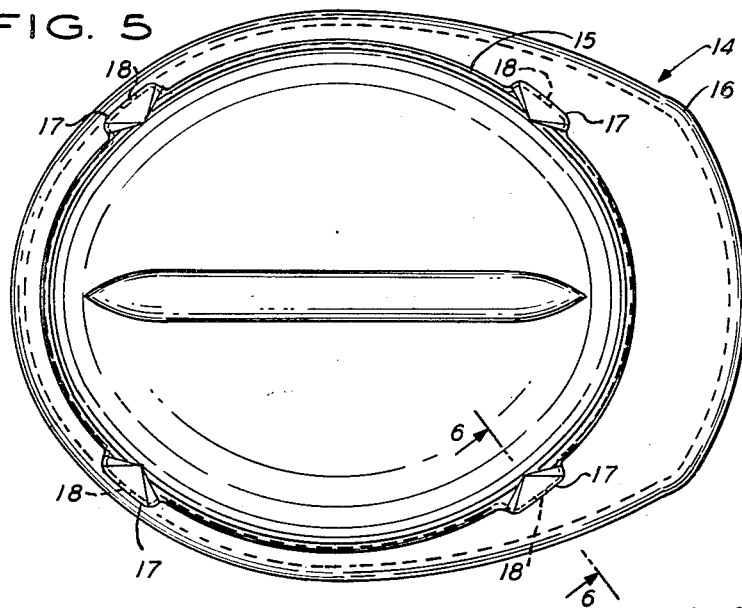
Figure 6:
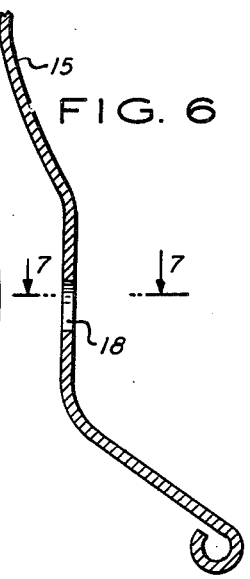
Figure 7:

FIGURE 4-A shows a detail of the shell construction;

FIGURE 5 is a top view of a metal shell, in the form of a cap;

FIGURE 6 is a sectional view of a detail of the shell shown in FIGURE 5, taken along line 6—6;

FIGURE 7 is a sectional view of a detail of the metal shell shown in FIGURE 5, the detail taken along line 7—7 of the section shown in FIGURE 6;

FIGURE 8 shows the clip used in association with the recesses of the metal shell shown in FIGURES 5 through 7;

FIGURE 9 is a side elevational view, partly broken away and in section, showing a safety shell such as the type shown in FIGURES 1 through 8, including a hammock assembly made in accordance with this invention;

FIGURE 10 is a planned view of the bottom side of the safety shell shown in FIGURE 9;

FIGURE 11 is a detailed view of the outer side of a headband used in the hammock assembly of this invention;

FIGURE 12 is a plan view of the connecting member, connecting the headband and other hammock structure to the shell;

FIGURE 13 shows details of the connection of the connecting member to a part of the hammock assembly, the crown piece;

FIGURE 14 is a vertical cross sectional view taken along line 14—14 of FIGURE 9, showing the engagement of the connecting member shown in FIGURE 12 to the shell;

FIGURE 15 shows another feature of this invention that is, the second set of straps, also shown in FIGURE 9;

FIGURE 16 is a detailed view of the connecting member and strap structure forming a part of this invention; and FIGURE 17 illustrates a modification in the mounting of the strap structure of the invention.

The fiber glass shell 1, in the form of a cap, shown in FIGURE 1 includes a crown portion 2, with a generally smooth and uniform inside surface, and a brim portion 3. The fiber glass shell shown in FIGURE 1 is shown as including the standard raised rib portion 4, which rib portion is not the subject matter of this invention and may be omitted or of any desired design. The shell 1 includes recessed areas 5 formed in the inside surface of the crown 2. As shown in FIGURE 2, the recessed areas 5 are formed by the surface 6 of the crown 2 and by fingers 7, integrally joined to the crown 2. As can be seen from examining FIGURES 1 and 2, two fingers 7 enclose the area 8 in the recessed area 5, which area 8 forms a slot bound by the surface 6 and the fingers 7. The slot receives the lug of a connecting member of a hammock apparatus, to be further described later in this specification.

One method of molding the recessed area with the fingers 7 in the fiber glass shell above is as follows:

A performed shell, in the shape of a cap as shown in the case of the shell shown in FIGURES 1 and 2, is put in the cavity of a mold. A premix of resin and fiber glass in the form of patches is added, at the recessed locations, before the mold is closed. A resin combine is poured into the preformed shell. The mold is then closed. Upon completion of the molding operation, reinforced fiber glass will be present throughout the area, including in the fingers 7; said fingers 7 thus are formed of reinforced fiber glass and are strong enough to support the hammock assembly, a part of which is inserted at each recessed area into the slot area 8 previously described.

The method of molding the fiber glass shell is not the subject of this invention; and the above method of molding is set forth merely as illustrative of one way of achieving a fiber glass shell with recessed areas having a slot formed therein of strength enough for supporting hammock apparatus.

It is pointed out that the fiber glass shell of this invention is not apertured and has no parts piercing the shell, including no metal parts such as a rivet. It is further pointed out that in the fiber glass shell just described there are no protuberances on the inside surface of the crown 2 of the shell 1, which would rest against the wearer's head and transmit blows to particular points on said head. As can be seen in FIGURES 1 and 2, the recessed areas 5 allow the surface 6, fingers 7 and area 8 forming the slot to be flush or indented from the inside surface of the crown 2 of the shell, so that no protuberances will abut the head of a wearer of the shell.

The fiber glass shell structure shown in FIGURES 1 and 2 is illustrated in the form of a cap. Obviously, said shell structure could be in the form of a helmet, hat, or any other desired shape; and the recessed areas 5, each containing slot structure formed by surface 6, fingers 7, and area 8 for reception of the hammock apparatus, would be the same in any of the latter mentioned shapes as described in relation to the fiber glass shell in the shape of a cap shown in FIGURES 1 and 2.

The plastic (dielectric) shell of FIGURES 3 and 4, shown in the form of a hat, includes equivalent structure to that described in FIGURES 1 and 2. The crown 10, including a generally smooth and uniform inside surface and brim 11 of the dielectric shell 9 is integrally molded, and the shell includes recessed areas 12 with fingers 13, which (shown in FIGURES 4 and 4-A) is the exact equivalent of the recessed areas 5 and fingers 7 of the fiber glass construction. The fingers 13 in each of the recessed areas 12 in the dielectric shell of FIGURES 3, 4, and 4-A form a slot, with the interior surface 47 (shown in FIGURE 4-A), in the same manner as discussed with relation to FIGURES 1 and 2. Thus, the same hammock assembly that is supported by the fiber glass shell in recessed areas 5 may be supported in recessed areas 12 by the plastic shell.

As indicated earlier in relation to the fiber glass shell, the plastic shell in the form of a hat shown in FIGURES 3 and 4, and 4–A, is merely illustrative of a particular shape of a plastic head covering shell. The recessed area and finger structure in a plastic cap, helmet, or whatever other shape shell desired, would be exactly the same as the recessed area 12 and the finger structure 13 shown in the hat of FIGURES 3, 4 and 4–A. It is pointed out that there are no metal parts necessary in the plastic shell, nor is there any aperture of the shell structure. It is further pointed out that in the plastic shell of FIGURES 3, 4, and 4–A, as well as in the fiber glass shell of FIGURES 1 and 2, as well as in the metal shell to be discussed below, as well as in any other shell structure according to the novel design of this invention, the same number of recessed areas are spaced the same distance apart in the inside surface of the crown of the shell structure. The number of recessed areas shown in all the figures is four, which four recesses will cooperate with connecting structure of the hammock assembly. Since the recessed area design is standard for the shells, as discussed above in relation to the fiber glass and plastic shells, and discussed hereinafter in relation to the metal shells, and since the same number of recessed areas spaced the same distance apart are located in each of the shells, as just pointed out, a single novel design of hammock apparatus, to be discussed in detail later in this specification, will fit in any shell. The particular number of recessed areas—four—found in all the shells shown in the figures described in this specification are shown for illustrative purposes and should not limit the scope of this invention.

FIGURES 5 through 8 relate to a metal shell, for example, aluminum shown in the shape of a cap. As stated previously in relation to the fiber glass and plastic shell, the shell structure shown in FIGURES 5 through 8 is shown as a cap merely for illustrative purposes and may also be a hat, helmet or of other desired head covering shape. The metal shell 14 shown in FIGURE 5 includes a crown portion 15, with a generally smooth and uniform inside surface, and brim portion 16. Recessed areas 17 are shown in the same positions as in the fiber glass or plastic shells shown in the preceding figures. The recessed areas 17, shown in detail in FIGURES 6 and 7, are perforated at 18, for reception of attachment means, such as a rivet (not shown) which secures slot structure within said recessed areas 17 to the inside surface of the crown 15. The slot structure or clip 19 (shown in FIGURE 8) contains finger structure to be described in detail below, which receives a lug of the connecting member of the hammock assembly, which hammock assembly was similarly received in the structure formed in the recessed area by the fingers in the fiber glass or plastic units, previously described. The rivet passes from the outside of the crown portion 15 through the aperture 18 to secure the clip 19, shown in FIGURE 8, to the inner surface of the recessed area shown clearly in FIGURES 6 and 7. The rivet passes through aperture 18 in crown portion 15, and through aperture 55 in clip 19 to secure clip 19 to the shell 14 within the recessed area 17. Other means than a rivet for attaching the clip 19 to the shell 14 could be used.

The fingers 20 of the clip 19, see FIGURE 8, extend inwardly to receive the lug of the connecting member of the hammock assembly, to be described in detail later, in the same way that the fingers 13 of the plastic shell and the fingers 7 of the fiber glass shell extend inwardly to form the slot structure and receive the lug of the connecting member. Inwardly turned area 21 of the clip forms the upper surface of the slot area within the recessed area 17, and rear inward surface 57 of the clip bounds the slot area, in the same manner that the surfaces in the recessed areas of the fiber glass and plastic shells form a slot area, as previously described. Because clips 19 are supported in the recessed areas 17 of the aluminum shell shown as four areas in FIGURE 5, all of the same construction, as shown in FIGURES 6 and 7, no protuberance within the inside of the shell 14 is present to transmit pressure to a particular point on a wearer's head. The locations of the recessed areas 17 in the shell 14 are spaced in the same orientation as described in the preceding paragraph in relation to the fiber glass and plastic shells, so that one hammock assembly, to be described hereinafter, can be used with any of the shells described.

Each of the shells described, be it aluminum, fiber glass or plastic has formed therein recessed areas, which include structure forming a slot for reception of a connecting member of a hammock assembly. As discussed in relation to FIGURES 1 through 8 above, the slot structure in each of the shells described is of the same design. For that reason, as previously discussed, a single novel hammock apparatus will fit any one of the shell constructions. Thus, with a single hammock apparatus there is complete interchangeability of shell materials and shapes. Furthermore, there are no protuberances in the inside surface of the crown of any of the shells which increases the safety of the shell structure, since pressures cannot be transmitted to particular points on a wearer's head. Furthermore, in both the plastic and fiber glass shells, there are no perforations through the shell surface and no metal parts pass through said shells making said shells safer for electrical uses and stronger.

FIGURES 9 and 10 show the relationship of the shell structure described in detail in relation to FIGURES 1 through 8 above to the hammock assembly which is positioned therein. The novel hammock assembly and its relationship to the shell structure described in the preceding paragraphs will be discussed in detail hereinafter.

As shown in FIGURE 9, the hammock apparatus 100 is located within the shell 101, said shell 101 composed of fiber glass, plastic or metal (for example aluminum), or the like, and of the design discussed in detail in the preceding paragraphs. The shell 101 may be of any desired shape, as discussed in relation to FIGURES 1 through 8, with the recessed areas 102 of the shell 101 containing slot structure as set forth in detail in relation to FIGURES 1 through 8. If the shell structure 101 is of metal (for example, aluminum material), means of attachment (for example, a rivet) will pass through said shell structure, as discussed hereinbefore in relation to the construction of a metal shell.

The hammock assembly 100 is formed with an adjustable head receiving headband 103, shown generally in FIGURE 9 and in detail in FIGURE 11. A series of holes 104 are located in the headband in order to receive a part of a connecting member, to be later described. Such holes 104 are shown at different levels on the headband so as to be able to receive the connecting member in different positions, thus allowing the headband to be adjustably positioned relative to the shell structure 101, as will be discussed later. For selectively adjusting the headband to the size of a wearer's head, the headband 103 is provided with a series of longitudinally spaced apertures 107 near one end thereof. A male element 108, receivable in any one of the apertures 107, is located near the opposite end of the headband for this adjustment. The slots 105 receive the integrally formed tab 106 extending longitudinally from the opposite end of the headband from that end in which said slots 105 are located. The slots 105 are longitudinally spaced to assist in maintaining the headband in adjusted position. A sweatband may be removably attached to the inside of the headband, in known manner. The attachment of the sweatband to the headband does not form a part of this invention. The headband may be made of vinyl material, polyethylene, or other desired materials, with materials that are flexible, strong, and easy to clean and work with (such as polyethylene) preferred. The replaceable sweatband is of standard material. For comfort, the headband 103 has slot structure 119 for receiving, in a number of positions, a chin strap (not shown).

The connecting member 109 supports the shell structure 101 on the headband 103, as shown in FIGURES 10 and 14.

The details of the connecting member 109 are clearly shown in FIGURE 12. Said connecting member 109 consists of an integrally molded structure with lug 110 forming a part thereof. Said lug 110 is received in the slot in the recessed area 102 of shell 101. (Said lug 110 of connecting member 109 is the lug referred to when describing the construction of slot structure of the recessed areas of the shell structure in relation to FIGURES 1 through 8, above.) The lug 110 is attached to depending member 111, which depending member 111, when the lug is placed in the slot of the recessed area of the shell, is firmly seated against the inside crown portion of the shell 101, see FIGURE 14, so as to lend stability to the support of the shell 101 as to be discussed immediately below. The depending portion 111 is integrally molded, at the top of the V-shaped portion 130, as shown in FIGURES 9, 12, and 14, to the supporting portion 112 of connecting member 109. The supporting portion 112 of the connecting member 109 has a male mating member 113 at each end thereof for reception in any one of the levels of holes 104 of the head band 103. Thus, in the position shown in FIGURE 9, the shell 101 is supported by the connecting member 109 on the headband strap 103.

As shown in FIGURE 14, the lug 110 of the connecting member is firmly and completely seated in the slotted recessed areas 102 of the shell. Depending member 111 frictionally engages and thus is supported against the inside surface of the crown 101. The firm seating and frictional support creates an environment of stable support for the shell on the hammock assembly. (The rivet which may be used in the metal shell to hold the slot structure in the recessed area abuts the lug 110 of the connecting member, and thus contributes to the tight engagement in said slot structure of the lug 110 as a result of frictional contact of the two.)

Furthermore, the one piece molding of the connecting member, especially the integral molding of the lug 110 to the depending member 111 and the one piece molding of the depending member 111 to the support member 112, greatly increases the stability of the connecting member and thus the stability of the mount of the shell on the head receiving headband, since movement of each of the last three mentioned parts relative to each other is greatly reduced. And still furthermore, the one piece molding of the connecting member is a distinctive advantage because its permanence of construction guarantees that the headband mounted to the connecting member in any selected position is in the correct position in relation to the shell. This is so because there is no further adjustment of the connecting member that can be made and the original dimensional design of the connecting member insures that the headband is in the proper position with relation to the shell when the lugs are in the slots. Furthermore, the snug and complete fit of the lug in the recessed slot eliminates any protuberances which would apply pressure to particular points on a wearer's head.

The disposition of the male members 113 increases the stability of the connection of the headband 103 to the shell, since said male members are permanently fixed in their relative positions, and secure in their attachment to the headband through holes 104. This is, one male member 113 cannot move in relation to the other. Thus, movement of the headband 103 in relation to the connecting member 109 when attached thereto is substantially eliminated, as is the possibility of detachment of the connecting member 109 from said headband. It will further be noted that the male members 113 will always go in place in the holes 104, in a simple manner, since, as discussed above, the relative position of the male members 113 is permanent and said male members do not have to be adjusted relative to one another before insertion in said holes. Said male members 113 may be received in any one of the rows of holes 104 of the headband shown in FIGURE 11, as previously discussed, allowing for adjustability of position of the headband in relation to the shell to which it is connected by the connecting member. It is further pointed out that the attachment of the supporting member 112 of the connecting member 109 to the headband is from the center of the shell toward the exterior of the shell; that is male members 113 extend outwardly through holes 104, thus avoiding protuberances or points of pressure against a wearer's head.

The depending member 111 and the supporting member 112 absorb the shock of a blow to the shell 101 in a springlike fashion. This shock absorber effect of said depending member and supporting member of the connecting member 109 substantially reduces the jar received by a wearer's head.

The integrally molded connecting member 109 may be formed of any number of materials chosen for strength, flexibility and ability to mold. For example, acrylonitrile butadiene styrene, Delrin or other acetal resins may be chosen. The particular material chosen to form the integral connecting member 109 is not the subject matter of this invention.

The connecting member 109 also includes large and small cutout areas 114 and 115, shown clearly in FIGURE 12. These cutout areas are found in the depending member 111. Attached through these cutout areas and overlying surface 116 between said areas is a loop 120 which is connected to two straps 117 and 118, shown in FIGURE 16, which pass over the head of a wearer of the hammock apparatus, said straps forming a seat for said head, a certain specified distance from the top inside surface of the shell 101. Two straps 117 and 118 are attached to the loop 120, which connects to the depending member 111, as previously discussed. The attachment of the straps 117 and 118 to the loop 120 may be a sewn attachment or an attachment of any other desired design. In FIGURE 10 it may be seen that in an embodiment of the invention, the connecting member 111 supports the shell 101 on the hammock assembly at four positions—A, B, C, and D. From the depending member 111 of the connecting member at each of the positions A, B, C, and D extend two straps, interior strap 117 and exterior strap 118. Looking up into the interior of the shell, as in FIGURE 10, the interior strap 117 is visible, said interior strap 117 is connected to a crown piece 121, as shown in FIGURE 13. The straps 117, each extending from a connecting member (at locations A, B, C and D) form a single strap element with the respective strap 117 extending up from the opposite connecting means, as shown in FIGURE 10. Thus, the four straps 117 shown in FIGURE 10 form two strap elements, each of which extends from opposite connecting members. Mounted on the two strap elements formed by straps 117 is the crown piece 121. The crown piece has slits 122 for receiving the strap elements said slits allowing said strap elements to pass from one surface (the under surface) to the other surface (the upper surface) of the crown piece. The crown piece is thus mounted on the inside set of strap elements. Said crown piece may be further attached (for example, by sewing 123) to said strap elements, if desired. Said crown piece is apertured as shown at 124 in order to increase ventilation. The crown piece serves to form a comfortable seat for the top of a wearer's head and stably supports the hammock and shell on said head. Said crown piece further serves to distribute to a broad area of the wearer's head the impact of a force on said shell, already substantially reduced, as a result of the connection of the shell to the connecting member the distributing effect of the strap elements, and the reducing effect of the shell itself. The crown piece is made of a vinyl material, or any other desired material, flexible, washable, and resistant to the absorption of head oils.

A strap 118 also extends from each of the connecting members 109, as previously discussed. Said straps 118 form a set of two outer strap elements as viewed in FIGURE 10, in the same manner as discussed above in relation to the formation of two strap elements from inner straps 117. Said two outer strap elements each extend from opposite connecting members 111. As shown in FIGURE 15, the two outer strap elements each comprised of straps 118, cross at 122 above the crown piece 121. The two outer strap elements shown in FIGURES 10 and 15 are longer than the corresponding inner strap elements. Said outer set of cross strap elements forms an insurance or safety factor when added to the inner crossed strap elements and crown piece 121. As the inner strap elements temporarily elongate under the force of a blow received on the shell, they are reinforced, or stiffened, by the outer strap elements to further absorb the impact and prevent the top of a wearer's head from contacting the inside surface of the shell (called "bottoming"). However, the extra stiffness of the double strap element construction is not present when the load is under a specified limit (that is lighter), since the shorter inner strap elements absorb the load without contacting the outer strap elements. Therefore, the two strap element construction allows for greater safety and comfort, as the stiff double strap protection is not employed, except where the heaviness of the load so demands.

Instead of mounting the straps 117 and 118 in the manner shown in FIGURES 13 and 16, in a further embodiment of this invention each strap 117 and 118 is mounted to the depending member 111 of the connecting member 109 at a different point on said depending member. Such mounting of straps 117 and 118 is shown in FIGURE 17. It will be noted in FIGURE 17 that straps 117 and 118 are each attached to separate loop structure 120 extending through separate slot structure 125. Adjacent slots 125 and 126, which lie between loops 120, may be combined into a single slot without departing from this invention. Each loop 120 will then extend through an independent slot and a common slot therebetween. As stated earlier, the attachment of the straps to the loop may be in any desired manner, such as by sewing the separate mounting affords extra protection. For example, as a result of the separate attachment of each strap to the connecting member, as shown in this embodiment, in the unlikely event of fracture of the loop attaching one strap (such as 117) to the connecting member, the workability of the other loop and its associated strap (such as strap 118) will not be affected.

It is pointed out that in both FIGURE 16 or 17, the length of the straps 117 and 118 are non-adjustable by the wearer, and the position of the straps in relation to the shell is always the same. Because of the constant (non-adjustable) length of the straps, the relative location of the points at which the two sets are always in the same position in relation to the shell, since they are mounted in only one position on the connecting member, which is always received in the same position in the shell, results in a complete guarantee that the straps will be in the required position with the required clearance to the top inside surface of the crown of the shell. This guarantee insures greater safety for the wearer of the shell and hammock assembly, since there is complete assurance that the required clearance from the top of a wearer's head to the shell is in fact found within the shell when in use, independent of any adjustment made by the user of the hammock assembly.

The fact that straps 117 and 118 are fixed in relative position and cannot be adjusted, while providing maximum safety and comfort, is of great advantage, as discussed in the preceding paragraph. Furthermore, it is not possible to throw away, disregard or misuse a part of the strap structure, thus making said strap structure inoperative, as is often done with devices of the prior art, wherein, for example, the strap structure included in such devices includes an adjustable type string which is often removed, disregarded, or incorrectly tied rendering such strap structure of the prior art inoperative, or at least severely affects the operativeness of the strap structures and thus the safety of the particular assembly.

Straps 117 and 118 are made of nylon, or other suitable material, and will not elongate in normal temperatures. The straps 117 and 118 are composed of the same material with the same degree of elasticity.

In a further embodiment of this invention, the straps 117 and 118 can be made of different degrees of elasticity with the inside straps 117 being more elastic than the outside straps 118, the straps 118 having a limited elasticity so as to insure absorption of significant blows on the shell 101. In this embodiment, the inside straps 117 are made with a high degree of elasticity so as to absorb the more frequent light blows which strike the shell 101 of a user. When a load is sufficiently great to exceed the load capabilities of the inside strap elements, then said inside strap elements merely stretch to a point where the outside strap element would come into service, by stiffening the inside strap elements, as described in a preceding paragraph. Thus, in this embodiment, straps 117 and 118 cooperate to greatly lighten the impact on a wearer's head of small blows to the shell mounted on said head, while still guaranteeing the necessary protection from more substantial blows.

It is pointed out that all the hammock components, that is, the headband strap, the connecting member, the two sets of strap elements, the loops, and the crown piece, plus the particular hat, cap, or helmet selected for use therewith are washable and may be sterilized.

It is believed that the advantages of the invention will be apparent from the foregoing detailed descripiton, including the several embodiments discussed. The hammock assembly components are related to one another to allow a shell to be positioned stably and comfortably upon the head of the wearer. The hammock components further provide many safety features insuring and increasing the protective capacities of the shell and hammock construction worn, as discussed in detail hereinbefore. The shell construction, for any shaped shell of any desired material, such as the commonly used fiber glass, plastic and metal, includes a number of novel features discussed hereinbefore, including a recessed slot design which allows the same hammock assembly to be used with all shells.

It will be apparent that the invention as specifically described above may be variously changed or modified without departing from the spirit and scope of the invention, as defined in the following claims.

I claim:

1. Head protecting apparatus comprising a shell having an inner surface, a hammock assembly inserted in said shell for reception of a wearer's head, an adjustable headband forming part of said hammock assembly, recessed areas in said inner surface, slot structure in each recessed area, a connecting member forming a part of said hammock assembly for supporting said shell, lug structure removably mounted within said slot structure in said each recessed area, said connecting member comprising a supporting member, means on said supporting member vertically adjustably mounted on said headband, a depending portion integrally molded to said supporting member, said lug structure integrally molded to said depending portion, said depending member in engagement with the inner surface of said shell for increased stability when the lug structure is mounted within said slot structure, strap elements attached to said connecting member for reception of the wearer's head, said strap elements being of fixed length, said strap elements attached to said member in fixed positions relative to each other, and said strap elements including a first set of strap elements overlying a second set so as to provide reinforcement of said second set after a predetermined elastic elongation thereof, and a crown piece member, for reception of the wearer's head, attached to said second set of said two sets of strap elements.

2. Head protecting apparatus as recited in claim 1, separate mounting means on said connecting member attaching each of said first and second sets of strap elements to said connecting member.

3. Head protecting apparatus as recited in claim 1, said recessed areas being of such configuration as to completely envelop said lug structure removably mounted therein.

4. Head protecting apparatus comprising a shell having an inner surface, a hammock assembly inserted in said shell for reception of a wearer's head, an adjustable headband forming part of said hammock assembly, recessed areas in said inner surface, slot structure in each recessed area, means forming a part of said hammock assembly for supporting said shell, lug structure removably mounted within said slot structure in said each recessed area, said means vertically adjustably mounted on said headband, said lug structure integrally molded to said means, and strap elements attached to said means, for reception of the wearer's head, said strap elements being of fixed length, said means supporting said shell comprised of at least one connecting member including a supporting member, means on said supporting member received by said headband for said adjustable mounting of said means on said headband, a depending portion integrally molded to said supporting member, which depending portion is in engagement with the inner surface of said shell for increased stability when the lug structure is mounted in the recessed slots.

5. Head protecting apparatus as recited in claim 4, said strap elements attached to said means in fixed positions relative to each other, and said strap elements including a first set of strap elements overlying a second set so as to provide reinforcement of said second set after a predetermined elastic elongation thereof, separate mounting means on said first-mentioned means attaching each of said first and second sets of strap elements to said connecting member.

6. Head protecting apparatus comprising a shell and a head receiving headband therefor, said shell having an inner surface, at least one recessed area in said inner surface, at least one connecting member for vertically adjustably mounting said shell on said head receiving headband, said connecting member comprising a supporting member, means on said supporting member cooperating with said headband for said adjustable mounting, a depending portion integrally molded to said supporting member, lug structure removably mounted within said recessed area integrally molded to said depending portion, said depending portion in engagement with the inner surface of said shell for increased mounting stability when the lug structure is mounted in the recessed area.

7. Head protecting apparatus as recited in claim 6, slots in said depending portion for reception of head protecting strap structure.

8. Head protecting apparatus as recited in claim 6, said recessed area being of such configuration as to completely envelop said lug structure removably mounted therein.

References Cited by the Examiner

UNITED STATES PATENTS

| | | | |
|---|---|---|---|
| 2,983,923 | 5/61 | Aileo | 2—3 |
| 3,040,329 | 6/62 | Ruggiero | 2—3 |
| 3,041,621 | 7/62 | Brockway | 2—3 |
| 3,083,371 | 4/63 | Austin | 2—3 |

JORDAN FRANKLIN, *Primary Examiner.*